United States Patent
Gopalasamy

(10) Patent No.: US 9,035,958 B2
(45) Date of Patent: *May 19, 2015

(54) ELECTRONIC DOCUMENT DELIVERY

(75) Inventor: Srinivasan Gopalasamy, Campbell, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/722,347

(22) Filed: Mar. 11, 2010

(65) Prior Publication Data

US 2010/0245929 A1 Sep. 30, 2010

Related U.S. Application Data

(60) Continuation of application No. 11/357,074, filed on Feb. 21, 2006, now Pat. No. 7,697,005, which is a division of application No. 09/876,274, filed on Jun. 6, 2001, now Pat. No. 7,019,858.

(51) Int. Cl.
G06F 13/14 (2006.01)
H04N 1/00 (2006.01)
H04M 11/06 (2006.01)

(52) U.S. Cl.
CPC ......... H04N 1/00209 (2013.01); H04M 11/066 (2013.01); H04N 1/00212 (2013.01); H04N 1/0035 (2013.01)

(58) Field of Classification Search
CPC .................................. G06F 3/14; H04N 1/00
USPC .......... 345/520; 358/408, 474, 402; 715/700, 715/748; 709/203
See application file for complete search history.

(56) References Cited

U.S. PATENT DOCUMENTS

| | | | | |
|---|---|---|---|---|
| 5,552,901 | A | * | 9/1996 | Kikuchi et al. ............... 358/468 |
| 5,675,507 | A | | 10/1997 | Bobo, II ........................ 709/206 |
| 5,790,790 | A | * | 8/1998 | Smith et al. ................... 709/206 |
| 5,845,076 | A | * | 12/1998 | Arakawa ....................... 709/203 |
| 5,911,044 | A | * | 6/1999 | Lo et al. ........................ 709/203 |
| 5,996,029 | A | * | 11/1999 | Sugiyama et al. .............. 710/15 |
| 6,012,083 | A | * | 1/2000 | Savitzky et al. .............. 709/202 |
| 6,031,975 | A | * | 2/2000 | Iijima .......................... 358/1.15 |
| 6,115,132 | A | * | 9/2000 | Nakatsuma et al. ......... 358/1.14 |
| 6,134,017 | A | | 10/2000 | Schlank et al. .............. 358/1.15 |
| 6,188,807 | B1 | * | 2/2001 | Arakawa ....................... 382/319 |
| 6,208,426 | B1 | | 3/2001 | Saito et al. ................... 358/1.15 |
| 6,289,371 | B1 | * | 9/2001 | Kumpf et al. ................. 709/203 |
| 6,427,032 | B1 | | 7/2002 | Irons et al. .................... 382/306 |
| 6,504,626 | B1 | * | 1/2003 | Shih ............................. 358/442 |
| 6,535,914 | B1 | * | 3/2003 | Pearson et al. ............... 709/220 |

(Continued)

OTHER PUBLICATIONS

"Special Edition Using Microsoft® Word 2000", May 6, 1999, Que Publishers, Chapters 4 and 20.

*Primary Examiner* — Maurice L McDowell, Jr.
(74) *Attorney, Agent, or Firm* — Fitzpatrick, Cella, Harper & Scinto

(57) ABSTRACT

A system, method and computer readable medium for converting paper documents to electronic documents and sending the electronic documents to at least one destination, involves receipt from a remote server of user interface information which provides a user interface for enabling the user to designate a destination of the electronic document, local display of the user interface in accordance with the user interface information, and dissemination of a destination as designated by the user via the displayed user interface.

16 Claims, 12 Drawing Sheets

(56) References Cited

U.S. PATENT DOCUMENTS

| | | | |
|---|---|---|---|
| 6,553,431 B1 * | 4/2003 | Yamamoto et al. | 710/8 |
| 6,633,913 B1 * | 10/2003 | Chalstrom et al. | 709/226 |
| 6,642,943 B1 * | 11/2003 | Machida | 715/763 |
| 6,704,775 B1 * | 3/2004 | Sato et al. | 709/219 |
| 6,804,016 B2 * | 10/2004 | Hashimoto et al. | 358/1.13 |
| 6,931,592 B1 | 8/2005 | Ramaley et al. | 715/209 |
| 6,952,831 B1 * | 10/2005 | Moore | 719/327 |
| 6,956,663 B1 * | 10/2005 | Iida | 358/1.15 |
| 7,106,464 B1 * | 9/2006 | Brylov | 358/1.15 |
| 2003/0072031 A1 * | 4/2003 | Kuwata et al. | 358/1.15 |

* cited by examiner

ELECTRONIC DOCUMENT DELIVERY

This application is a continuation of application Ser. No. 11/357,074, filed Feb. 21, 2006, which was a division of application Ser. No. 09/876,274, filed Jun. 6, 2001, issued as U.S. Pat. No. 7,019,858 on Mar. 28, 2006, the contents of which are incorporated herein by reference.

BACKGROUND OF THE INVENTION

1. Field of the Invention

This invention relates generally to converting documents from paper to electronic form, and more particularly, to a method for automatic conversion of a paper document to an electronic document and delivery of the electronic document to a desired destination.

2. Description of Background Art

People often wish to send copies of paper documents to a remote destination. These people sending copies of paper documents to remote destinations are "sending users." However, conventional methods for performing this task are unsatisfactory.

In conventional methods for scanning and sending the document over the Internet, the sending user must manually enter many commands. The sending user first enters commands to scan the paper document. If the paper document has more than one page, the sending user then enters commands to combine the scanned pages into a single electronic document. The sending user then enters commands to send the electronic document to the destination. This requires the sending user to perform multiple steps, which is time consuming and inefficient.

Faxing is another conventional method for sending copies of paper documents to a remote destination. Faxing, too, has drawbacks. If the sending user faxes the document, the receiver must have the capability to receive faxes. Fax machines provide poor image quality. Also, the fax cannot be sent if the receiving fax machine is busy.

A third conventional method for sending copies of paper documents to a remote destination is to physically send a paper copy of the document. This can be done by overnight mail or a courier, for example. However, physically sending a paper copy of the document is expensive and takes more time than electronic delivery.

What is needed, therefore, is a method and system that allows a sending user to quickly and easily convert paper documents to electronic documents and send the electronic documents to a destination.

DISCLOSURE OF INVENTION

The present invention is a system, method, and computer readable medium for converting paper documents (134) to electronic documents (138) and sending the electronic documents (138) to at least one destination (144).

The method includes the step of sending commands (142), from a server computer (102) to a sending computer (114) with a connected scanner (122), that control the sending computer (114) to scan the paper document (134), generate the electronic document (138), and send the electronic document (138) to the server computer (102). The method also includes the steps of receiving the electronic document (138) at the server computer (102) and sending the electronic document (138) to the destination (144).

The system (100) includes a user interface module (108). The user interface module (108) receives a selected destination (144) from a sending computer (114). In response, the user interface module (108) sends commands (142) to the sending computer (114). A command module (130) connected to the user interface module (108) generates the commands (142). The commands (142) control the sending computer (114) to scan a paper document (134), generate an electronic document (138), and send the electronic document (138) to the user interface module (108). A distribution module (146) is connected to the user interface module (108). After the user interface module (108) receives the electronic document (138), the user interface module (108) sends the electronic document (138) to the distribution module (146). The distribution module (146) then sends the electronic document (138) to the selected destination (144).

An advantage of the present invention is that it allows a sending user (136) to quickly and easily convert a paper document (134) to an electronic document (138) and send the electronic document (138) to a selected destination (144).

BRIEF DESCRIPTION OF THE DRAWINGS

The above and other more detailed and specific objects and features of the present invention are more fully disclosed in the following specification, reference being had to the accompanying drawings, in which.

DETAILED DESCRIPTION OF THE PREFERRED EMBODIMENTS

The present invention is a system, method, and computer readable medium for converting paper documents 134 to electronic documents 138 and sending the electronic documents 138 to at least one destination 144.

Figure 1:
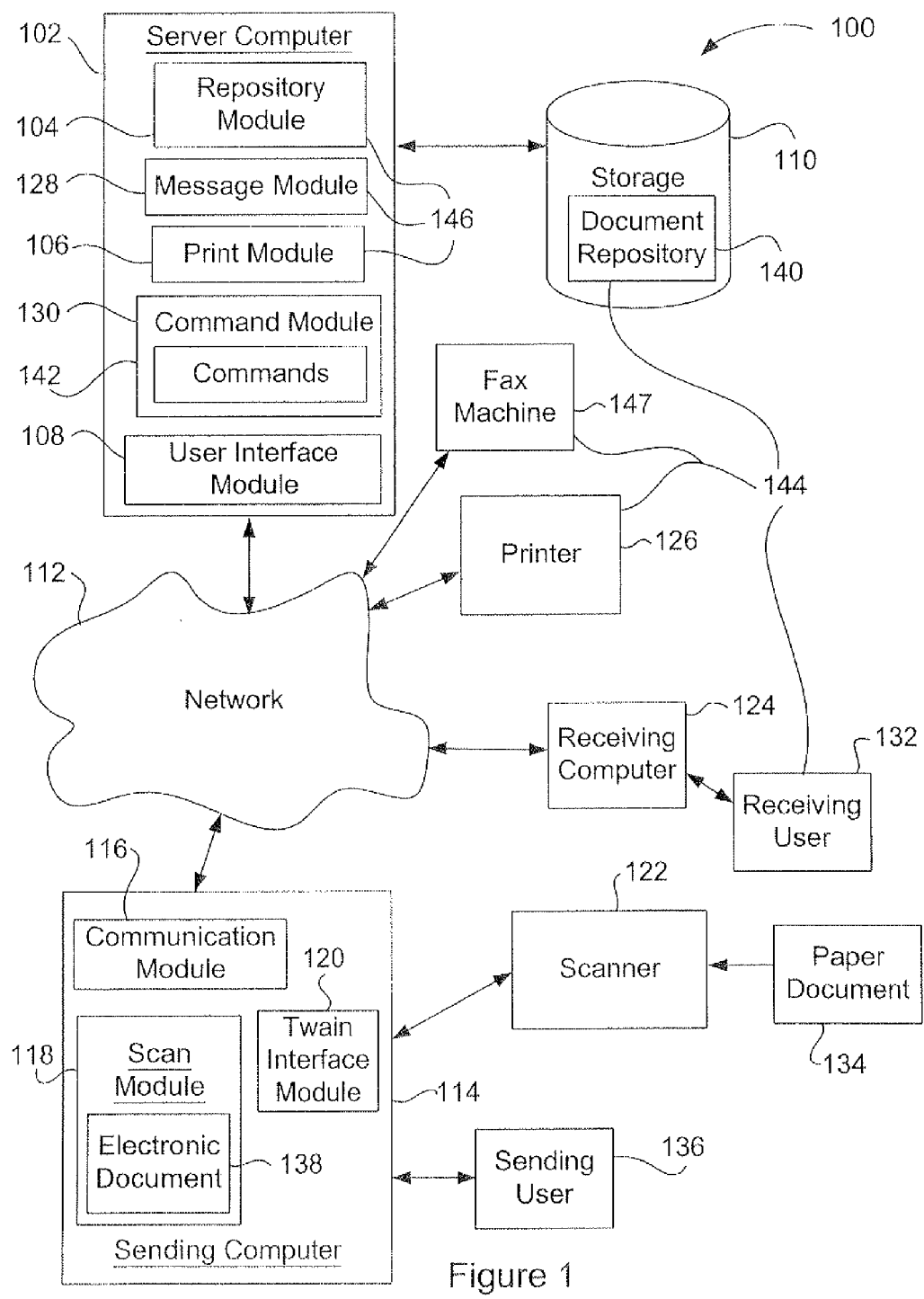
FIG. 1 is a block diagram of a system for converting paper documents to electronic documents and sending the electronic documents to a destination.

FIG. 1 is a block diagram of a system 100 for converting paper documents 134 to electronic documents 138 and sending the electronic documents 138 to at least one destination 144. The system 100 includes a server computer 102. The server computer 102 is connected to storage 110 and to a network 112. In one embodiment, the network 112 is the Internet. However, other networks 112 may also be used.

The server computer 102 includes a user interface module (a "UI module") 108, a command module 130, a print module 106, a message module 128, and a repository module 104. Each of these modules can be implemented in software, hardware, or firmware.

The UI module 108 sends information to a sending computer 114 via a network 112. The information the UI module 108 sends to the sending computer 114 includes data to provide a user interface, as well as commands 142 from the command module 130 that control the sending computer 114. In one embodiment, the UI module 108 sends Web pages to provide the user interface, and the commands 142 are ActiveX commands. The UI module 108 also receives information from the sending computer 114 via the network 112. The information the UI module 108 receives from the sending computer 114 includes the sending user's 136 preferences for scanning the paper document 134, at least one destination 144 selected by the sending user 136 for the electronic document 138, and the electronic document 138 itself. Possible destinations 144 include a document repository 140, a printer 126, another user (known as a "receiving user" 132), and a facsimile ("fax") machine 147. Other destinations 144 are also possible. The UI module 108 also communicates with the command module 130, the print module 106, the message module 128, and the repository module 104.

The command module 130 of the server computer 102 generates commands 142 that control the sending computer 114. In one embodiment, the commands 142 are ActiveX commands that control the sending computer 114 to scan the paper document 134, generate the electronic document 138, and send the electronic document 138 to the server computer 102. The command module 130 sends the commands 142 to the user interface module 108, which in turn sends the commands 142 to the sending computer 114.

The repository module 104, the message module 128, and the print module 106 are all distribution modules 146, which function to distribute the electronic document 138 to the selected destination. Other distribution modules 146 also exist in other embodiments to send the electronic document 138 to other destinations 144. After the server computer 102 receives the electronic document 138 at the user interface module 108, the user interface module 108 sends the electronic document 138 to the appropriate distribution module 146, according to the selected destination 144.

The message module 128 receives the electronic document 138 from the UI module 108 if the selected destination 144 is a receiving user 132, and the electronic document 138 is to be sent to the receiving user 132 as an attachment to a message. In such a case, the message module 128 sends a message to the receiving user 132 with the electronic document 138 attached. In one embodiment, this message is an electronic mail message (an "email").

If the selected destination 144 is a receiving user 132, and the electronic document 138 is not to be sent to the receiving user 132 as an attachment, the electronic document 138 is sent from the UI module 108 to the repository module 104. The repository module 104 sends information needed to retrieve the electronic document 138 to the message module 128. The message module 128 then sends a message to the receiving user 132 with instructions on how the receiving user 132 may access the electronic document 138.

The receiving user 132 receives the electronic document 138 using a receiving computer 124. The receiving user 132 accesses the network 112 using the receiving computer 124. In one embodiment, the receiving computer 124 is a personal computer. The receiving user 132 uses the receiving computer 124 to access the receiving user's 132 message, which either includes the electronic document 138 as an attachment or includes instructions how to access the electronic document 138.

If the selected destination 144 is a document repository 140, the repository module 104 receives the electronic document 138 from the UI module 108. The repository module 104 then sends the electronic document 138 to the document repository 140 located in storage 110. In one embodiment, the storage 110 is a hard disk drive, although other data storage devices may also be used. The repository module 104 also sends to the document repository archiving information that identifies the electronic document 138 and allows later retrieval of the electronic document 138 from the document repository 140 in storage 110. The repository module 104 manages the document repository 140 to correctly store and track the electronic documents 138 so that the electronic documents 138 may be retrieved at a later time. The repository module 104 also receives and stores the electronic document 138 if the selected destination is a receiving user 132, and the electronic document 138 is not to be sent to the receiving user 132 as an attachment.

If the selected destination is a receiving user 132, and the electronic document 138 is not to be sent to the receiving user 132 as an attachment, the repository module 104 sends to the message module 128 information needed by the receiving user 132 to access the electronic document 138 to the message module 128. The message module 128 then sends this information to the receiving user 132.

If a paper copy of the electronic document 138 is to be printed, the print module 106 of the server computer 102 sends the electronic document 138 to a destination printer 126. The print module 106 may receive the electronic document 138 and the identity of the destination printer 126 from either the UI module 108 or the repository module 104. If the selected destination 144 is a printer 126, the print module 106 receives the electronic document 138 from the UI module 108. If the receiving user 132 accessed the electronic document 138 in the document repository 140, the receiving user 132 may choose to print the electronic document 138. In such a case, the repository module 104 retrieves the electronic document 138 from the document repository 140 and sends the electronic document 138 to the print module 106. While only one printer 126 is shown in FIG. 1, multiple printers 126 are connected to the network 112 and are available to print the electronic document 138. The print module 106 keeps track of the available printers 126 and sends the electronic document 138 to the destination printer 126 to be printed.

If the electronic document 138 is to be sent to a fax machine 147, a fax module (not shown) of the server computer 102 sends the electronic document 138 to a destination fax machine 147. The fax module may receive the electronic document 138 from either the UI module 108 or the repository module 104. If the selected destination 144 is a fax machine 147, the fax module receives the electronic document 138 from the UI module 108. If the receiving user 132 accessed the electronic document 138 in the document repository 140, the receiving user 132 may choose to fax the electronic document 138. In such a case, the repository module 104 retrieves the electronic document 138 from the document repository 140 and sends the electronic document 138 to the fax module. While only one fax machine 147 is shown in FIG. 1, multiple fax machines 147 are connected to the network 112 and are available to receive the electronic document 138. The fax module sends the electronic document 138 to the destination fax machine 147.

The sending computer 114 sends the selected destination 144 and the electronic document 138 to the server computer 102. In one embodiment, the sending computer 114 is a personal computer. While only one sending computer 114 is shown in FIG. 1, multiple sending computers 114 may exist. Each sending computer 114 is connected to the network 112. By having multiple sending computers 114 at multiple different locations, the sending user 136 may send the paper document 134 from many different locations. A scanner 122 is connected to the sending computer 114 via a TWAIN interface module 120 in the described embodiment. In other embodiments, the scanner 122 is connected to the sending computer 114 via other interfaces. The TWAIN interface module 120 is connected to a scan module 118, which controls the scanner 122 via the TWAIN interface module 120. The sending computer 114 includes a communication module 116 that receives information from the UI module 108 and sends information to the UI module 108. In one embodiment, the communication module 116 is a Web browser. The browser receives the Web pages and ActiveX commands 142 sent from the UI module 108.

A receiving computer 124 is also connected to the Internet 112. The receiving computer 124 is one possible destination for the electronic document 138. Again, while only one receiving computer 124 is shown in FIG. 1, many may exist. This allows receiving users 132 at many different locations to receive the electronic document 138.

In operation, the communication module 116 of the sending computer 114 receives the Web pages sent by the UI module 108 and displays them to provide an interface that allows a sending user 136 to select a destination 144 for the electronic document 138. In some embodiments, the sending user 136 may select multiple destinations 144 for the electronic document 138.

The UI module 108 of the server computer 102 receives the identity of the destination 144 from the communication module 116. The command module 130 generates commands 142 and sends the commands 142 to the UI module 108. The UI module 108 then sends the commands 142 to the sending computer 114. The communication module 116 receives the commands 142 from the UI module 108. The communication module 116 then sends the commands 142 to the scan module 118. In response to the commands 142, the scan module 118 controls the scanner through the TWAIN interface 120 to scan the paper document 134 and generate the electronic document 138. The scan module 118 sends the electronic document 138 to the communication module. The communication module 116 then sends the electronic document 138 to the server computer 102 via the network 112.

The server computer 102 receives the electronic document 138 at the UI module 108. After receiving the electronic document 138, the server computer 102 sends the electronic document 138 to one of the distribution modules 146, which sends the electronic document 138 to the selected destination 144, previously received from the sending computer 114.

Figure 2:
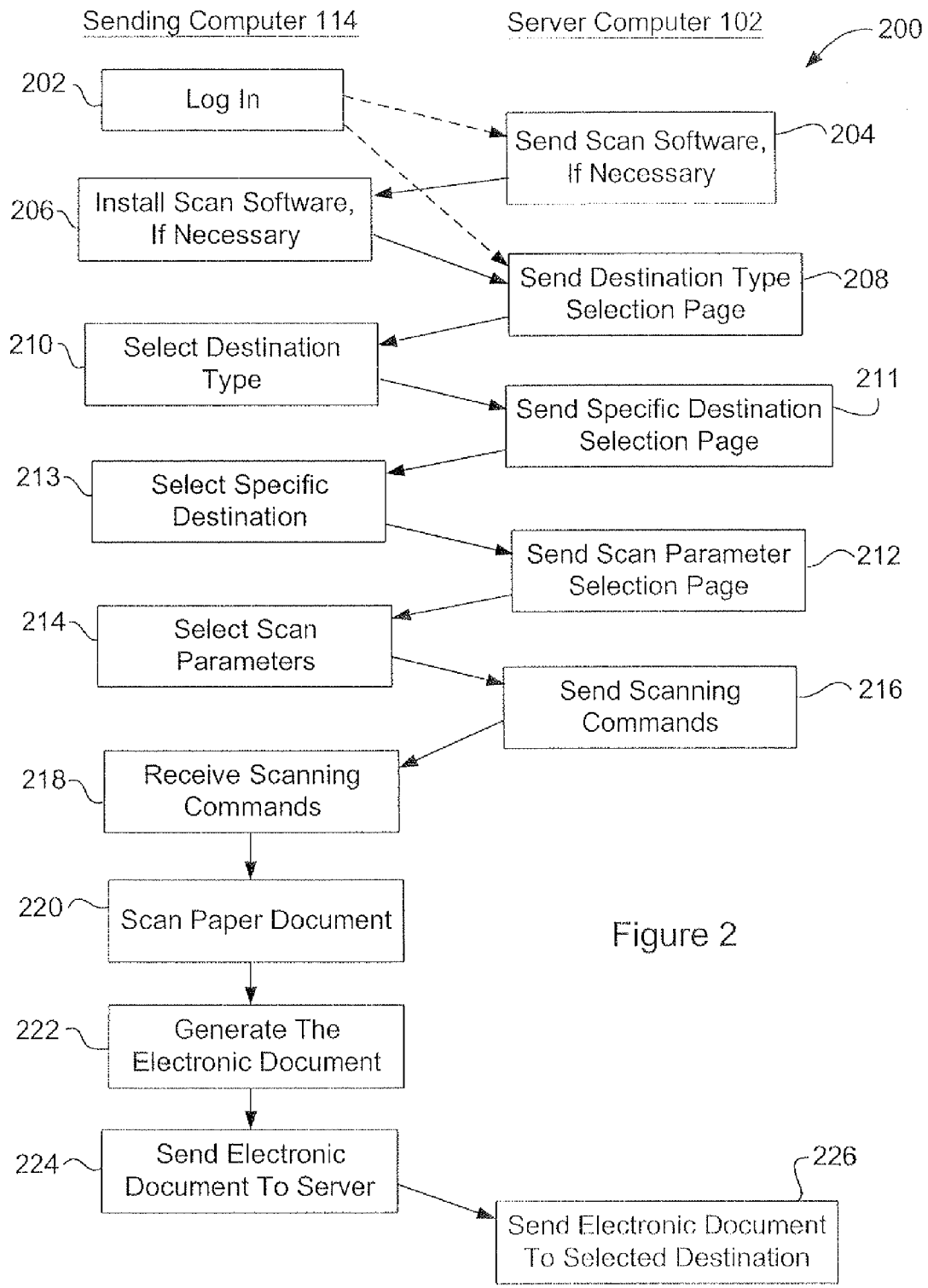
FIG. 2 is a flow chart illustrating how the system scans a paper document, generates the electronic document, and sends the electronic document to the destination.

FIG. 2 is a flow chart 200 illustrating how the system 100 scans the paper document 134, generates the electronic document 138, and sends the electronic document 138 to the destination 144.

First, the sending user 136 logs in 202 from the sending computer 114. In one embodiment, the sending computer 114 is a personal computer with a scanner 122 connected via a TWAIN interface, with an Internet connection, and an Internet browser acting as the communication module 116. In this embodiment, any computer with the Internet connection, browser, and scanner 122 with TWAIN interface may be used as the sending computer 114. Since many computers have all these items, there are a large number of computers available for use as a sending computer 114, providing many locations from which to send the paper document 134, which provides the sending user 136 with flexibility and choice. To log-in, the sending user 136 accesses a Web site using the browser. In response, the UI module 108 of the server computer 102 sends a log-in Web page to the sending computer 114. The sending user 136 enters log-in information, which includes a user name and password. This information is sent to the server computer 102.

In one embodiment, the scan module 118 is implemented in software. At time of log-in, the sending computer 114 may or may not have the scan module 118 software installed. The server computer 102 detects whether the sending computer 114 has the scan module 118 software installed. If the sending computer 114 does not have the software, the server computer 102 sends 204 the software to the sending computer 114. The sending computer 114 installs 206 the software upon receiving it. Thus, the sending computer 114 does not need to have the scan software pre-installed in order to use the scanning system 100. By logging into the server computer 102, the sending computer 114 will receive the scan software. By not requiring sending computers 114 to have the scan software pre-installed, the system 100 allows many computers to function as sending computers 114.

After installing 206 the scan software, or after logging in 202 if the sending computer 114 already has the scan software installed, the server computer 102 sends 208 to the sending computer 114 a destination type selection Web page that allows the sending user 136 to select the destination type. The communication module 116 of the sending computer 114 displays the Web page and the sending user 136 enters information selecting 210 the destination type. In the described embodiment, the destination type is a printer 126, the document repository 140, a receiving user 132, or a fax machine 147. Other embodiments have additional destination types, and in some embodiments, the sending user 136 may select multiple destination types. The identity of the selected destination type is sent to the server computer 102.

In response to the selected destination type, the server computer sends 211 to the sending computer 114 a specific destination selection Web page that allows the sending user 136 to select the specific destination. The communication module 116 of the sending computer 114 displays the Web page and the sending user 136 enters information selecting 213 the specific destination. The specific destination is the particular destination within the destination type where the electronic document is to be sent. For the destination type of "printers," a specific printer is the specific destination. Similarly, a location within the document repository 140 is the specific destination for the document repository 140 destination type, a particular receiving user is the specific destination for the receiving user destination type, and a particular fax machine telephone number is the specific destination for the fax machine destination type.

The server computer then sends 212 a Web page to the sending computer 114 that allows the sending user 136 to select 214 scanning parameters. The server computer 102 receives the scanning parameters that the sending user 136 selects.

At this point, the server computer 102 has received the destination type, the specific destination, and the scanning parameters. The server computer 102 generates scanning commands 142 and sends 216 the scanning commands 142 to the sending computer 114. In one embodiment, the scanning commands 142 are embedded in a Web page as an ActiveX control component and sent from the server computer 102 to the sending computer 114.

The communication module 116 of the sending computer 114 receives 218 the ActiveX scanning commands 142 from the server computer 102. The communication module 116 sends the scanning commands 142 to the scan module 118.

In response to the commands 142, the scan module 118 controls the TWAIN interface module 120 to scan 220 the paper document 134. To scan the paper document 134, the scan module 118 sends signals to the TWAIN interface module 120, which controls the scanner 122 to scan the paper document 134. The scanner 122 returns an electronic representation of each page of the paper document 134 to the TWAIN interface 120.

The scan module 118 then receives the electronic representation of each page of the paper document 134 from the TWAIN interface and generates 222 the electronic document 138. In one embodiment, to generate 222 the electronic document 138, the scan module 118 converts the electronic representations into PDF-format electronic files. The scan module 118 combines the PDF-format electronic files into the electronic document 138.

The scan module 118 sends the electronic document 138 to the communication module 116, which in turn sends 224 the electronic document 138 to the server computer 102. After receiving the electronic document 138, the server computer 102 sends 226 the electronic document 138 to the selected destination.

Figure 3:
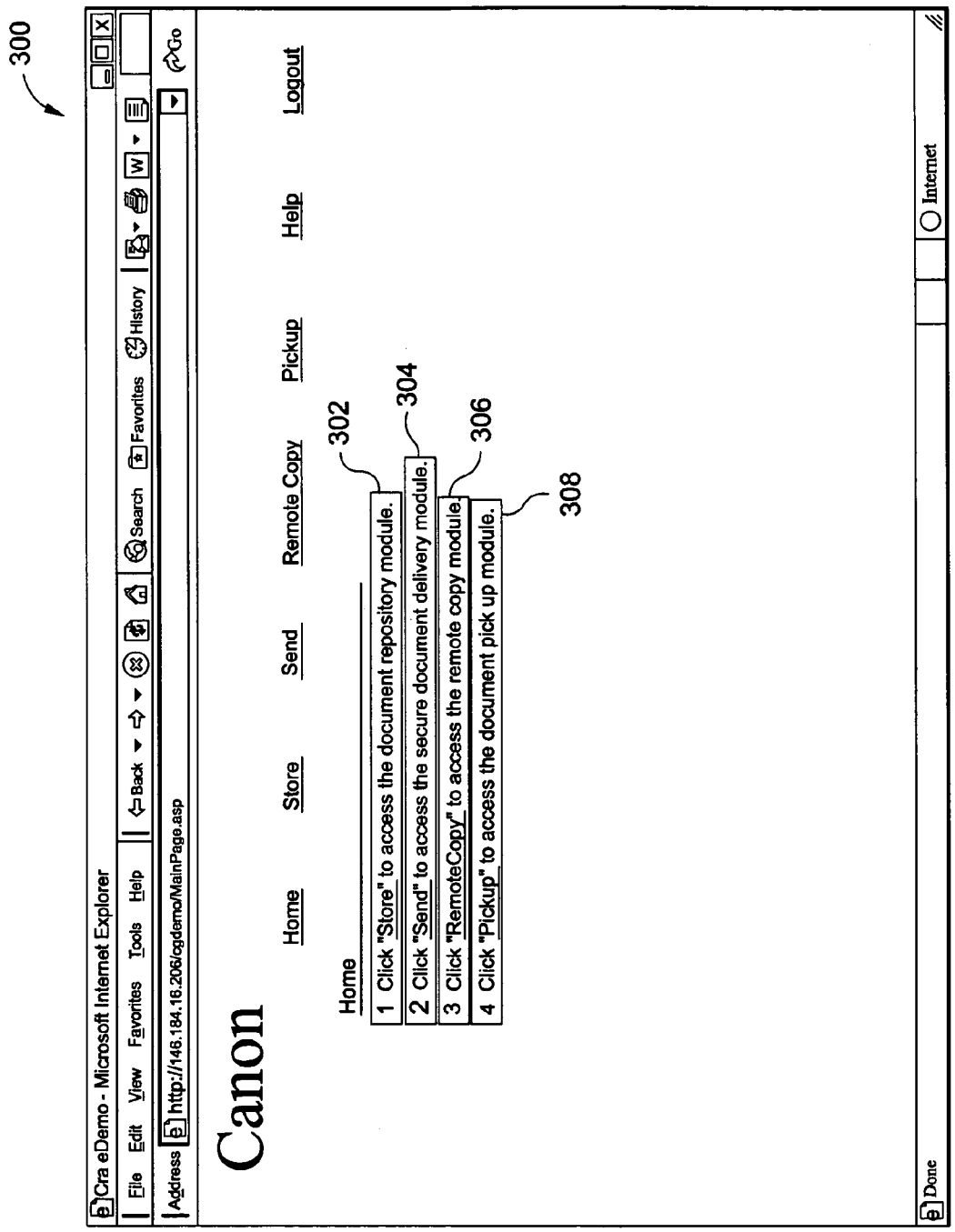
FIG. 3 is a screen shot detailing how a sending user selects a general destination.

FIG. 3 is a screen shot 300 detailing how the sending user 136 selects 210 a type of destination. After selecting the type of destination 144, the sending user 136 still must select the specific destination 144. In the embodiment shown in FIG. 3, the sending user 136 may select the document repository 140, a printer 126, or a receiving user 132 as the destination type. To select the document repository 140 as the destination type, the sending user 136 clicks on "Store" 302. To select a printer as the destination type, the sending user 136 clicks on "RemoteCopy" 306. To select the receiving user 132 as the destination type, the sending user 136 clicks on "Send" 304. In some embodiments, when the receiving user 132 is the destination type, the electronic document 138 is sent to the receiving user 132 as an attachment to an email. In other embodiments, an email with instructions describing how to access the document is sent to the receiving user 132. In some embodiments, to select a fax machine 147 as the destination type, the sending user 136 clicks on "fax" (not shown).

The screen shown in FIG. 3 also allows a receiving user 132 to access the electronic document 138, which has previously been sent to the document repository 140. To do so, the receiving user 132 selects "Pickup" 308. The receiving user 132 may then view, download, or print the electronic document 138.

FIGS. 4(a) through 4(d) detail how a sending user 136 selects the specific destination 144 after choosing the destination type.

Figure 4A:
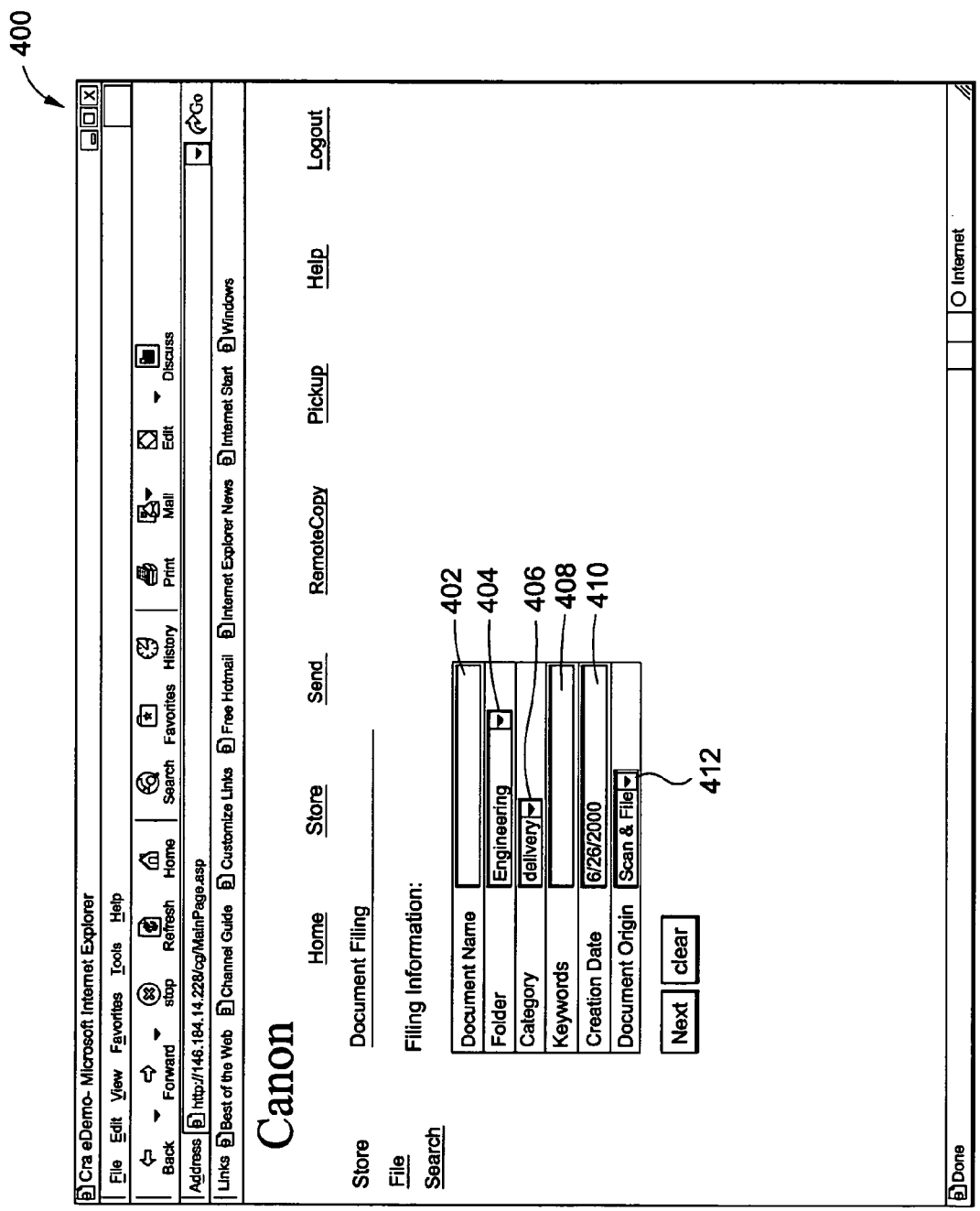
FIG. 4(a) is a screen shot detailing how the sending user enters archiving information.

FIG. 4(a) is a screen shot 400 detailing how a sending user 136 enters archiving information that identifies the electronic document 138 and allows later retrieval of the electronic document 138 from the document repository 140. This occurs after the sending user 136 has selected the document repository 140 as the destination type. In the embodiment shown in FIG. 4(a), the sending user 136 enters a name for the electronic document 138 in the name field 402, chooses a folder in which the electronic document 138 will be stored from the folder menu 404, chooses a category for the electronic document 138 from the category menu 406, enters any key words in the Keyword field 408, enters a creation date in the date field 410, and chooses an origin for the document from the origin menu 412. The server computer 102 receives and stores this information.

The UI module 108 of the server computer 102 receives the electronic document 138. The UI module 108 sends the electronic document 138 to the repository module 104. The repository module 104 sends the electronic document 138 to storage 110, where the electronic document 138 is stored in the document repository 140 according to the archiving information the server computer 102 already received.

Thus, the sending user 136 may send the document to a document repository 140 from remote locations using a sending computer 114 connected to a scanner 122 and a network 112. Also, the sending user 136 does not need to separately scan the paper document 134, combine the resulting electronic images into the electronic document 138, and send the electronic document 138 to the document repository 140. Once the sending user 136 selects the destination 144, the server computer 102 sends commands 142 to control the sending computer 114 to perform these functions automatically.

Figure 4B:
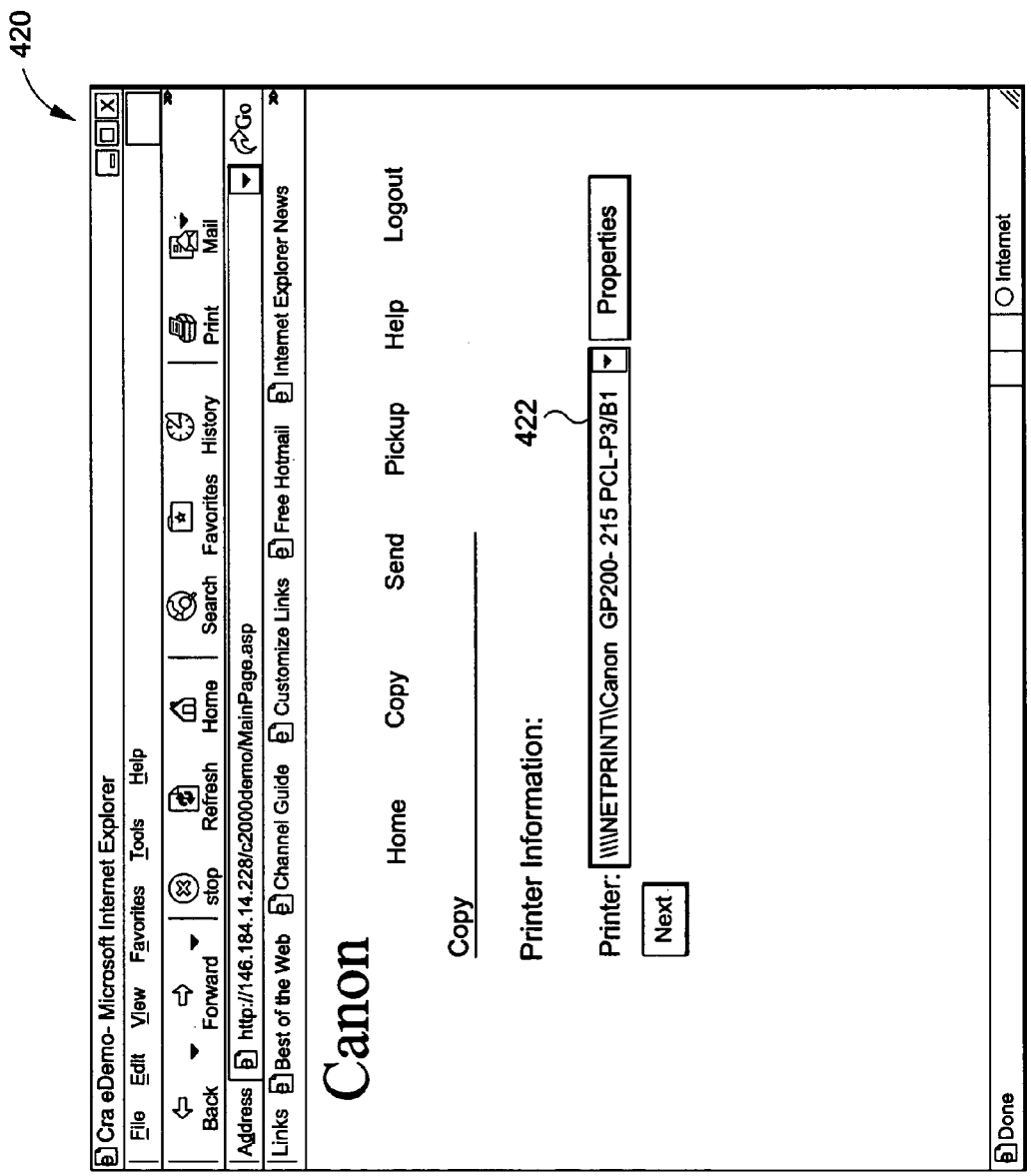
FIG. 4(b) is a screen shot detailing how the sending user identifies a specific printer

FIG. 4(b) is a screen shot 420 detailing how a sending user 136 identifies a specific printer 126 after choosing a printer 126 as the destination type. As discussed previously, FIG. 1 shows one printer 126 connected to the network 112. However, many printers 126 may be connected to the network 112 and available to the server computer 102 to print the electronic document 138. An identification of each of the printers 126 that is available to print the electronic document 138 is accessible from the screen shown in FIG. 4(b). In the embodiment shown in FIG. 4(b), the printers 126 are listed in a printer menu 422 on the Web page. The sending user 136 selects the printer 126 on which to print the electronic document 138 from the printer menu 422.

The server computer 102 receives the identification of the selected printer 126. When the server computer 102 receives the electronic document 138 from the sending computer 114, the UI module 108 receives the electronic document 138. The UI module 108 sends the electronic document 138 to the print module 106. The print module 106 sends the electronic document 138 to the selected printer 126, where a paper copy of the electronic document 138 is printed.

Thus, the sending user 136 may cause a paper copy of the paper document 134 to be delivered to a remote location cheaply and quickly, by choosing the printer 126 at that location. The final print quality is higher than a fax, depending on the printer capabilities. Also, fax machines may be busy and prevent a connection at a time when a sending user 136 wishes to send a paper copy of the paper document 134, necessitating further attempts to fax.

If the sending user 136 selects a receiving user 132 as the destination 144 for the electronic document 138, the sending user 136 may send the electronic document 138 to the receiving user 132 in two ways. The sending user 136 may send the electronic document 138 to the receiving user 132 as an attachment to an email. Alternatively, the server computer 102 stores the electronic document 138 in storage 110 and sends an email with information that tells how to retrieve the electronic document 138 to the receiving user 132.

After choosing the receiving user 132 as the destination type, the sending user 136 chooses whether to send the electronic document 138 to the receiving user 132 as an email attachment, or to send an email to the receiving user 132 with instructions on how to retrieve the electronic document 138, which is stored in storage 110.

Figure 4C:
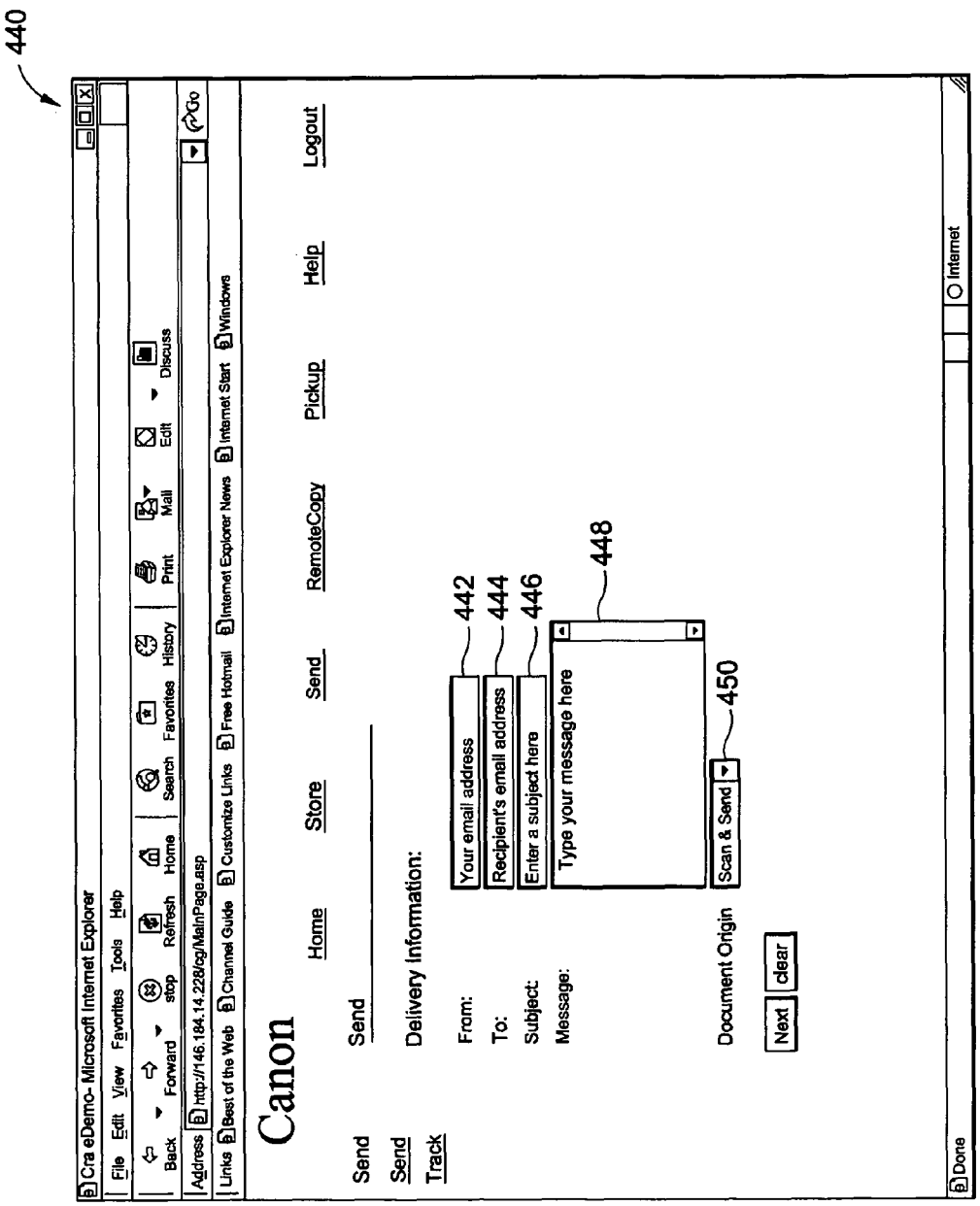
FIG. 4(c) is a screen shot detailing how the sending user identifies a specific email address to which the electronic document will be sent, when the electronic document is sent as an attachment to the email message.

FIG. 4(c) is a screen shot 440 detailing how the sending user 136 identifies the specific email address to which the electronic document 138 will be sent, in embodiments where the electronic document 138 is sent as an attachment to the email message. The sending user 136 enters the sending user's 136 email address in the sender field 442, the receiving user's 132 email address in the receiver field 444, a subject for the email message in the subject field 446, optionally, a message in the message field 448, and chooses an origin from the origin menu 450. The server computer 102 receives and stores this information.

When the server computer 102 receives the electronic document 138 from the sending computer 114, the UI module 108 receives the electronic document 138. The UI module 108 sends the electronic document 138 to the message module 128. The message module 128 sends an email to the receiving user's 132 email address. The electronic document 138 is sent as an attachment to the email. Thus, the receiving user 132 receives the electronic document 138, and may review, print, modify, or otherwise use the electronic document 138.

Thus, the sending user 136 may send the electronic document 138 to a receiving user 132 using a receiving computer 124 connected to the network 112. Also, the sending user 136 does not need to separately scan the paper document 134, combine the resulting electronic images into the electronic document 138, attach the electronic document 138 to an email message, and send the email to the receiving user 132. Once the sending user 136 selects the destination 144, the server computer 102 sends commands 142 to control the sending computer 114 to perform these functions automatically. Further, the receiving user 132 may receive the electronic document 138 at any location where there is a receiving computer 124.

Figure 4D:
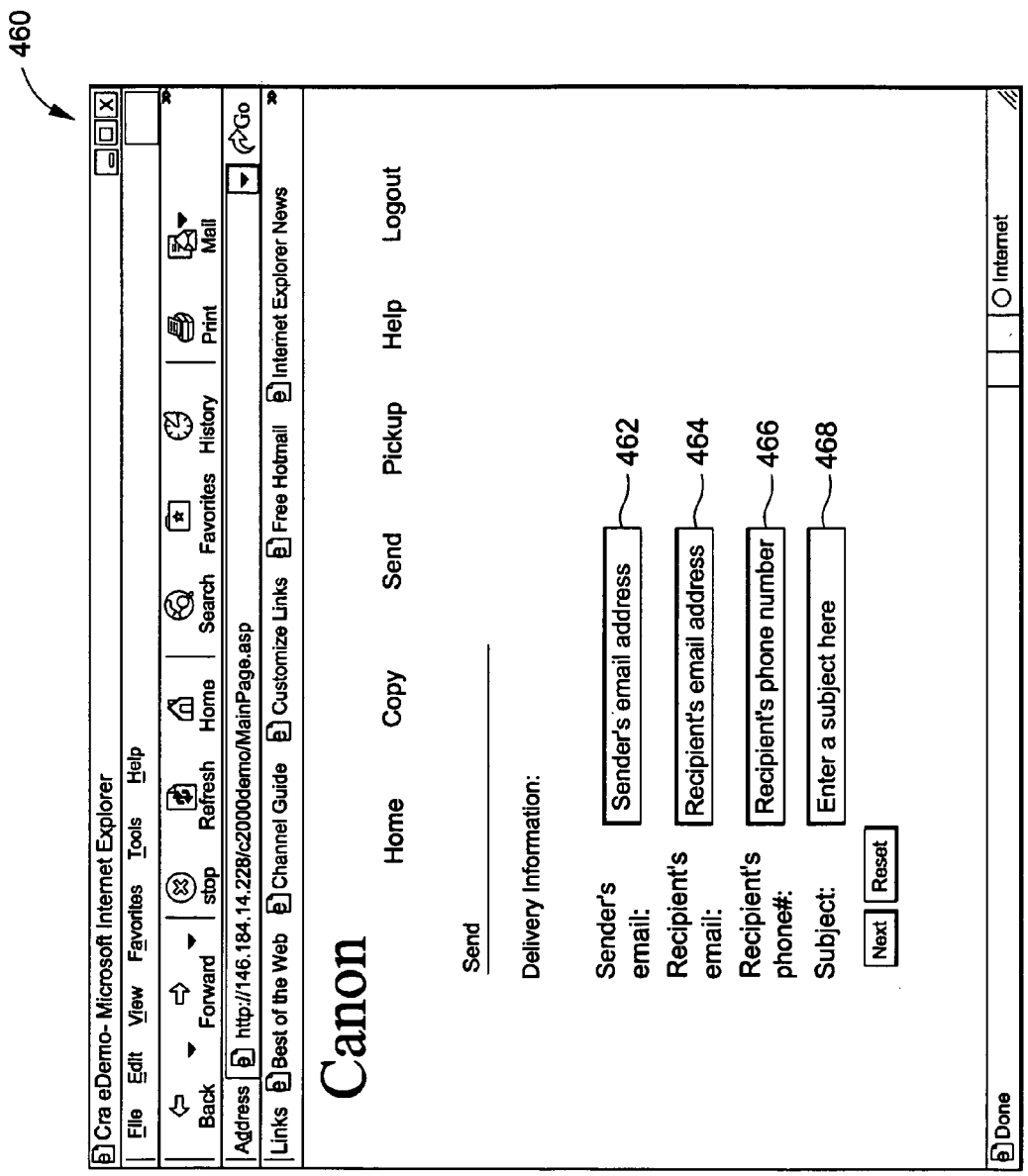
FIG. 4(d) is a screen shot detailing how the sending user identifies a specific email address to which directions for retrieving the electronic document will be sent.

FIG. 4(d) is a screen shot 460 detailing how the sending user 136 identifies the email address to which directions for retrieving the electronic document 138 will be sent, in embodiments where the receiving user 132 receives an email with instructions for retrieving the electronic document 138 instead of receiving the electronic document as an attachment. In the embodiment shown in FIG. 4(d), the sending user 136 enters his or her email address in the sender's email field 462, the receiving user's 132 email address in the recipient's email field 464, the receiving user's 132 phone number in the recipient's phone number field 466, and a subject for the email in the subject field 468. The server computer 102 receives and stores this information.

The UI module 108 of the server computer 102 receives the electronic document 138. The UI module 108 sends the electronic document 138 to the repository module 104, which stores the electronic document 138 in the document repository 140 in storage 110. The repository module 104 sends information needed to access the electronic document 138 to the message module 128. The message module 128 sends an email to the receiving user's 132 email address. The email sent to the receiving user's 132 email address contains directions disclosing how the receiving user 132 may access the electronic document 138.

Thus, the sending user 136 may give a receiving user 132, using a receiving computer 124 connected to the network 112, access to the electronic document 138. The sending user 136 does not need to separately scan the paper document 134, combine the resulting electronic images into the electronic document 138, send the electronic document 138 to the document repository 140 in storage 110, and send the receiving user 132 an email with instructions how to access the electronic document 138. Once the sending user 136 selects the destination, the server computer 102 sends commands 142 to control the sending computer 114 to perform these functions automatically. Further, the receiving user 132 may receive the electronic document 138 at any location where there is a receiving computer 124.

To identify the particular fax machine 147 to which the electronic document will be sent, the sending user 136 enters a fax machine telephone number in a fax machine telephone number field. The server computer 102 receives the fax machine telephone number. When the server computer 102 receives the electronic document 138 from the sending computer 114, the UI module 108 receives the electronic document 138. The UI module 108 sends the electronic document 138 to the fax module. The fax module sends the electronic document 138 to the selected fax machine 147.

Thus, the sending user 136 may send the paper document 134 to a remote fax machine 147 quickly, by choosing the remote fax machine. Also, if the fax machine 147 is busy and unable to accept a connection at a time when a sending user 136 wishes to send the fax, the server computer is capable of making repeated fax attempts until the fax machine 147 can receive the fax.

Figure 5:
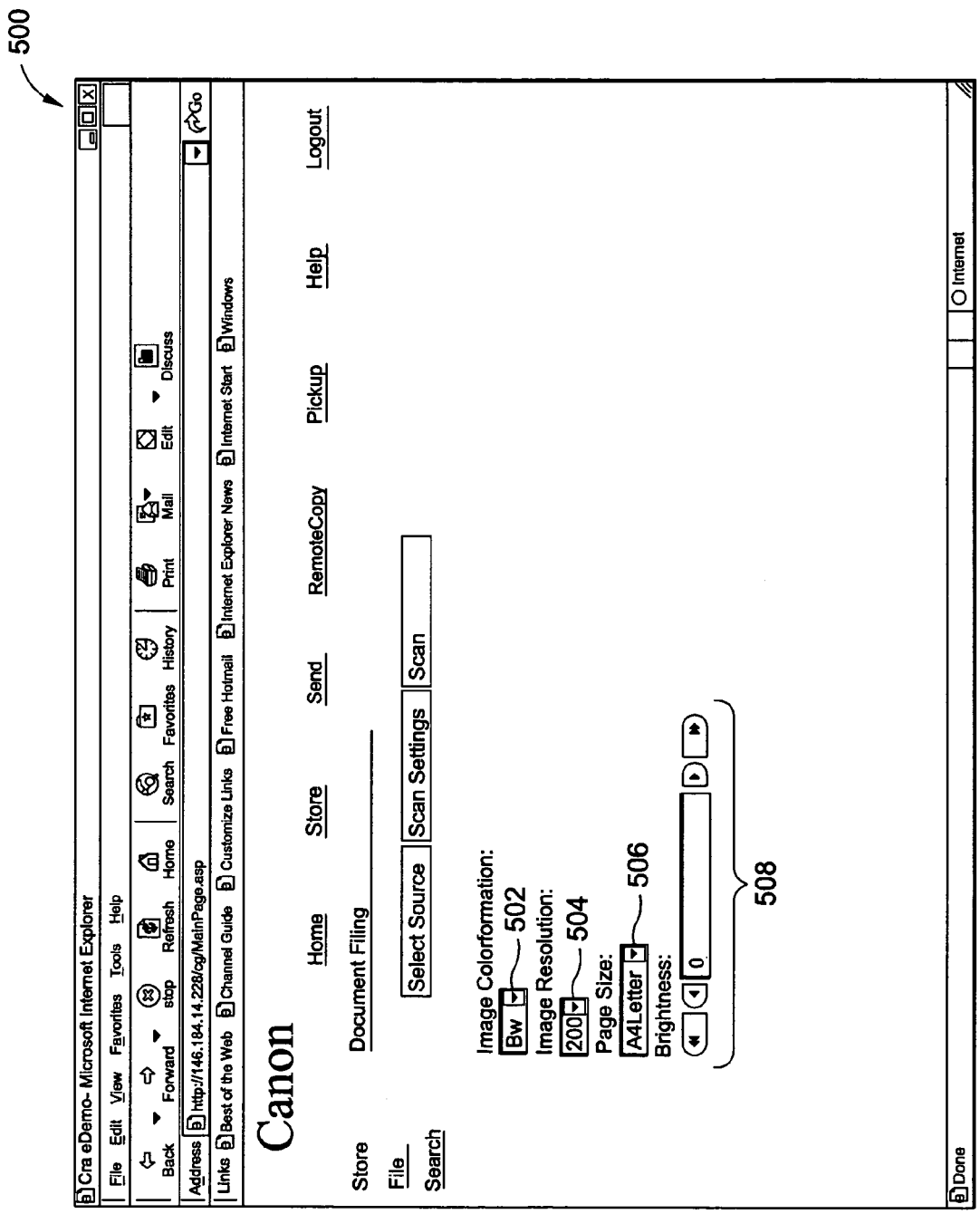
FIG. 5 is a screen shot detailing how the sending user selects scan parameters.

FIG. 5 is a screen shot 500 detailing how the sending user 136 selects 214 the scan parameters. The sending user 136 chooses an image format from the format menu 502, an image resolution from the resolution menu 504, a page size for the paper document 134 from the page size menu 506, and scanning brightness from the brightness controls 508. After receiving the scan parameters, the server computer 102 sends to the sending computer 114 the commands 142, generated by the command module 130, to scan the paper document 134, generate the electronic document 138, and send the electronic document 138 to the server computer 102, as discussed above.

Figure 6A:
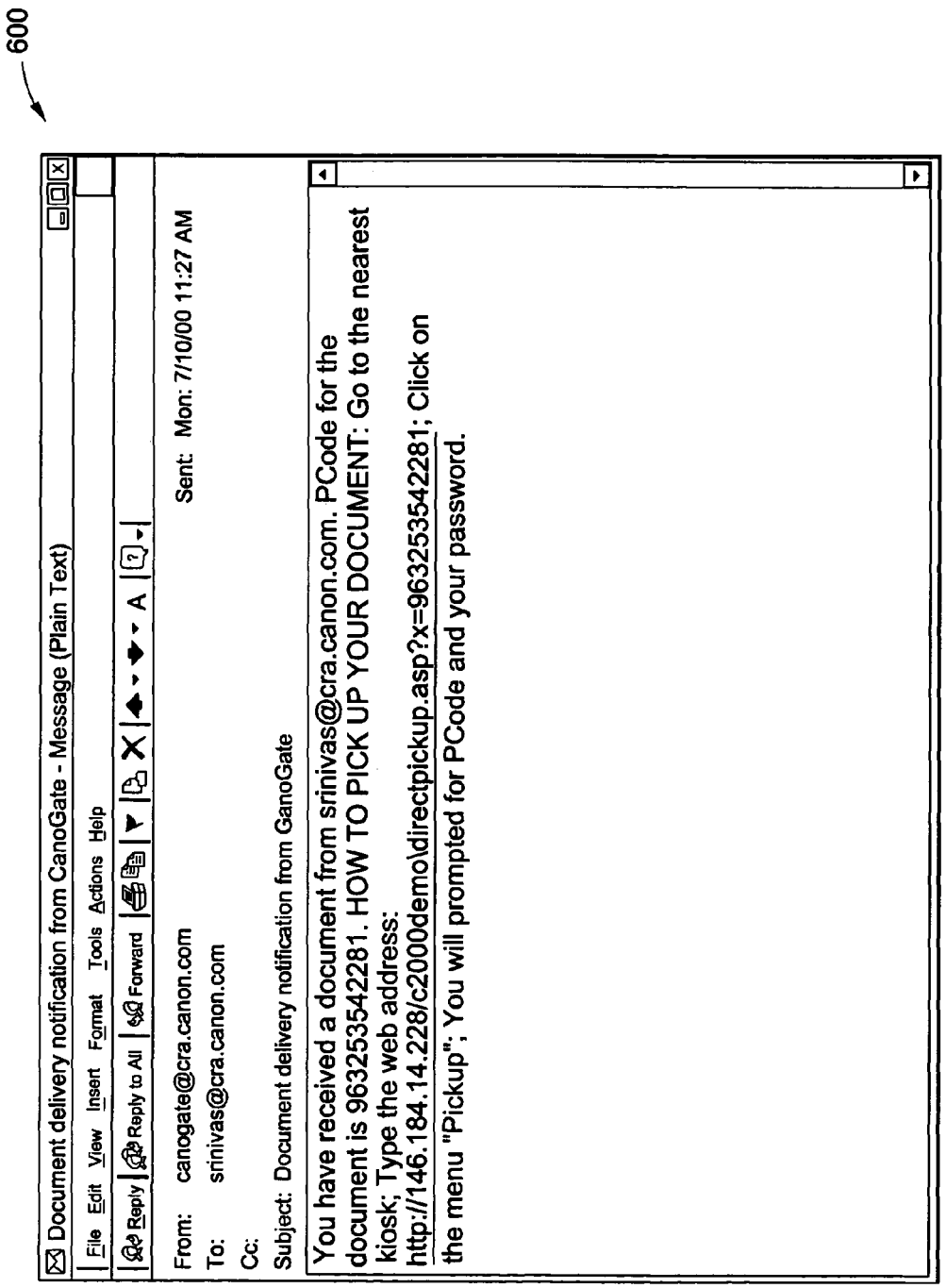
FIG. 6(a) is a screen shot showing that a receiving user receives an email.

FIGS. 6(a) through 6(d) detail what happens after the sending user 136 enters the information shown in FIG. 4(d). FIG. 6(a) is a screen shot 600 showing that the receiving user 132 receives an email. This email informs the receiving user 132 that he or she has received the electronic document 138. The email also informs the receiving user 132 how to access the electronic document 138. In the embodiment shown in FIG. 6(a), the email message includes a Web address for the receiving user 132 to visit to access the electronic document 138, as well as a PCode for the electronic document 138. The PCode is a unique identifier for the electronic document 138.

Figure 6B:
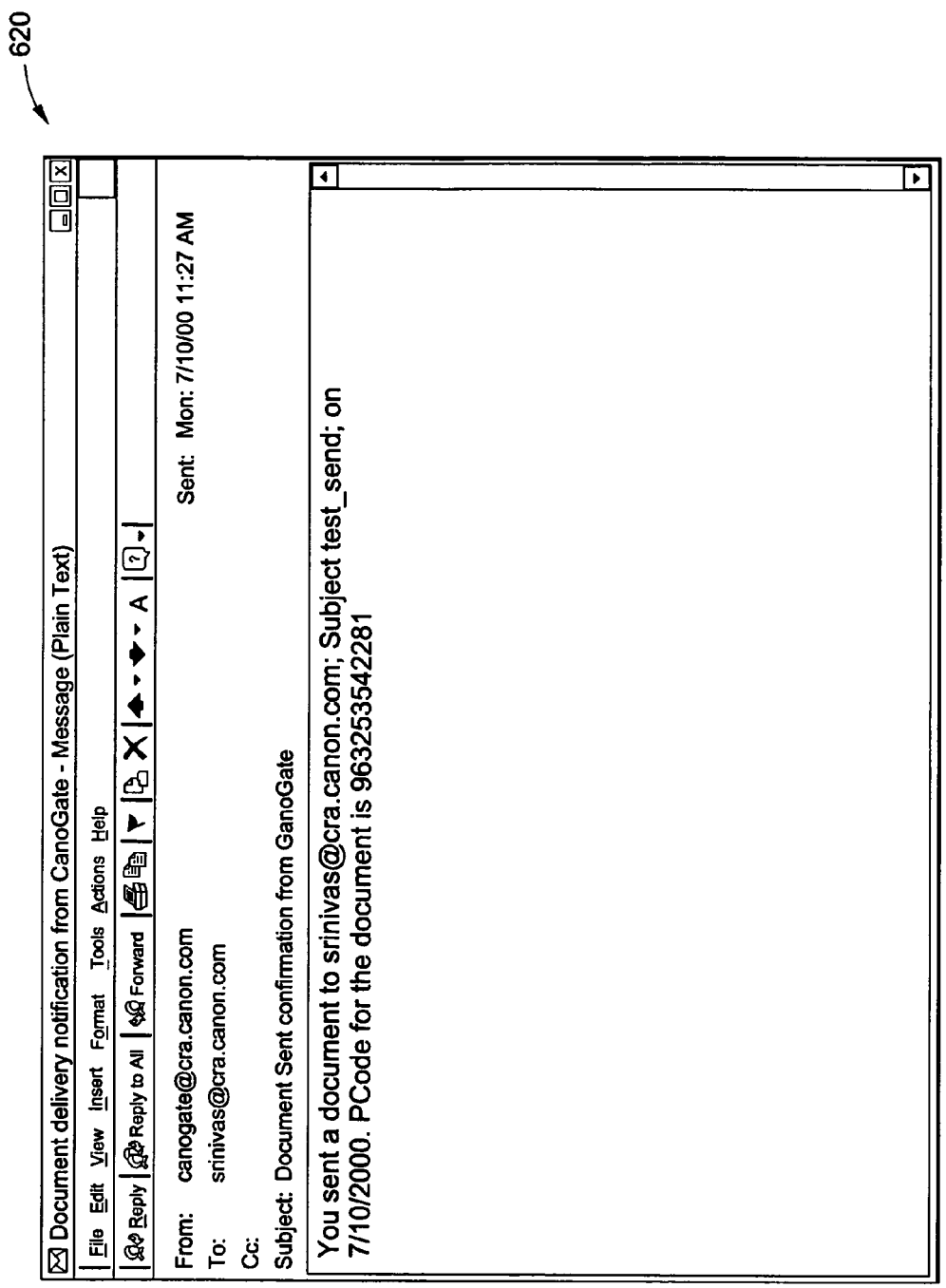
FIG. 6(b) is a screen shot showing a confirmation email received by the sending user.

In some embodiments, the sending user 136 receives confirmation that the electronic document 138 was sent to the receiving user 132. FIG. 6(b) is a screen shot 620 showing a confirmation email received by the sending user 136. This email confirms that the server computer 102 sent the electronic document 138 to the receiving user 132. The email also provides information needed to access the electronic document 138. Thus, the sending user 136, as well as the receiving user 132, may access the electronic document 138.

Figure 6C:
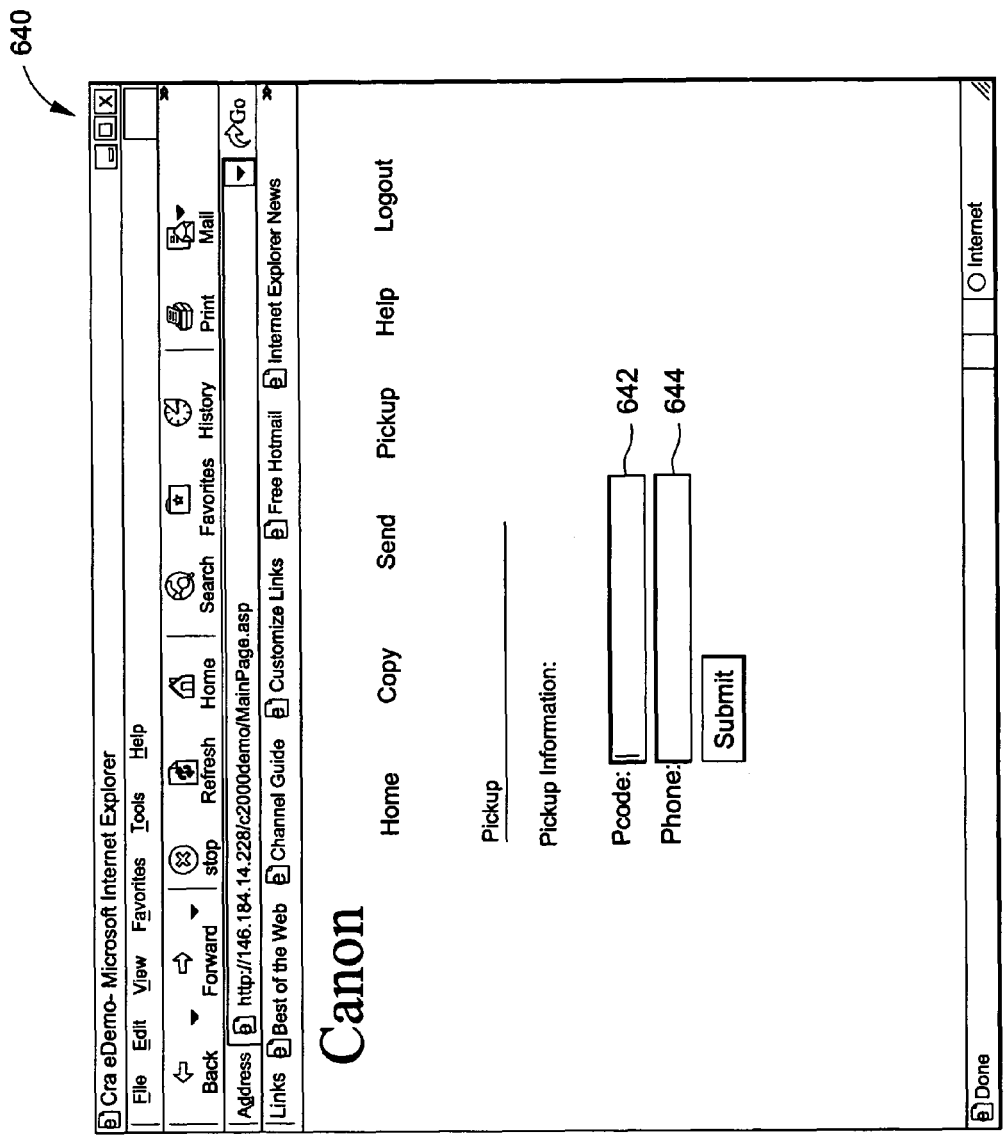
FIG. 6(c) is a screen shot showing how the receiving user accesses the electronic document.

FIG. 6(c) is a screen shot 640 showing how the receiving user 132 accesses the electronic document 138. After the receiving user 132 accesses the Web address specified in the email, the Web page shown in FIG. 6(c) is presented to the receiving user 132. The receiving user 132 enters the information identifying the electronic document 138. In the embodiment shown in FIG. 6(c), the information identifying the electronic document 138 is the PCode. The email sent to the receiving user 132, shown in FIG. 6(a), provided the receiving user 132 with the PCode for the electronic document 138. The receiving user 132 enters this PCode into the PCode field 642.

In the embodiment shown in FIG. 6(c), the receiving user 132 also enters his or her phone number into the phone field 644. This provides confirmation that the receiving user 132 is the person accessing the electronic document 138. In an alternative embodiment, the receiving user 132 may register with a password prior to retrieving the electronic document 138. The receiving user 132 then enters his or her password into a password field (not shown) instead of their phone number into the phone field 644.

Figure 6D:
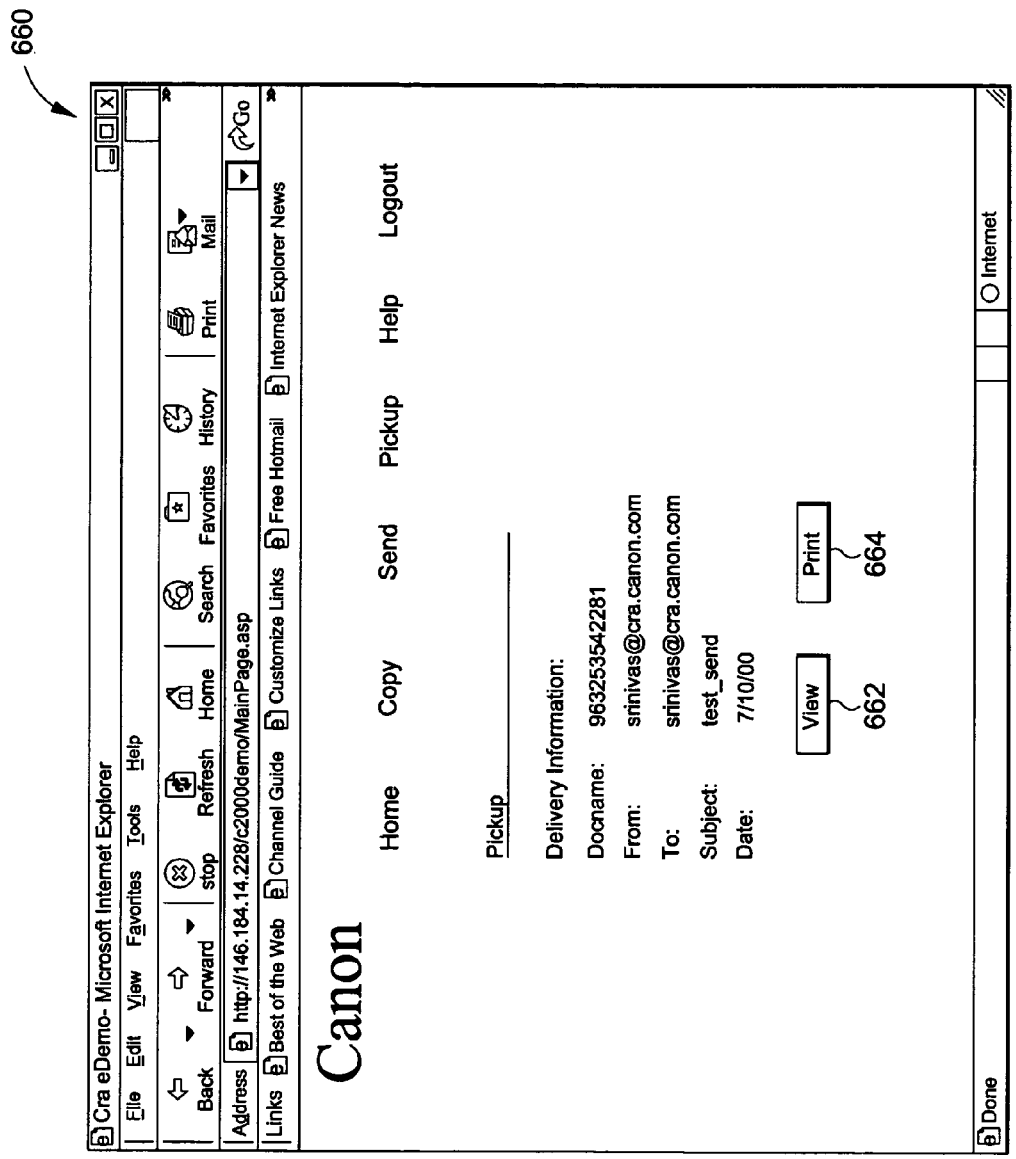
FIG. 6(d) is a screen shot showing what the receiving user sees after entering a PCode and phone number into the screen shown in FIG. 6(c).

FIG. 6(d) is a screen shot 660 showing what the receiving user 132 sees after entering the PCode and phone number into the screen 640 shown in FIG. 6(c). As shown in FIG. 6(d), the receiving user 132 has a choice of how to receive the electronic document 138. The receiving user 132 may view the electronic document 138 by selecting the view button 662. This provides the receiving user 132 with the ability to view the electronic document 138 in electronic form. The receiving user 132 may also select to print a paper copy of the electronic document 138 by selecting the print button 664. After selecting the print button, the receiving user 132 is then presented with a printer selection screen similar to the one shown in FIG. 4(b). The receiving user 132 then selects a printer, which then prints a paper copy of the electronic document 138. In an alternate embodiment, the receiving user 132 may also choose other ways to receive the electronic document 138, such as downloading the electronic document 138 to the receiving computer 124.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A scanning control apparatus which is configured to communicate with a server computer via a network, and which is configured to cause a scanner to scan a paper document, the scanning control apparatus comprising:
   a first receiving unit configured to receive, from the server computer via the network, user interface information which provides a user interface for enabling a user to designate a scan parameter to be used for scanning of the paper document;
   a display unit configured to display the user interface based on the user interface information received from the server computer via the network;
   a first sending unit configured to send, to the server computer via the network, the scan parameter designated by the user via the displayed user interface;
   a second receiving unit configured to receive, from the server computer via the network, a scanning command to cause the scanner to scan the paper document, the received scanning command being based on the scan parameter sent by the first sending unit; and
   a control unit configured to cause the scanner to scan the paper document in accordance with the received scanning command, to generate electronic data.

2. The scanning control apparatus according to claim 1, further comprising a third receiving unit configured to receive, from the server computer via the network, user interface information which provides a user interface for enabling a user to designate a destination of the electronic data.

3. The scanning control apparatus according to claim 2, further comprising a fourth receiving unit configured to receive, from the server computer via the network, user interface information which provides a user interface for enabling a user to designate a type of the destination of the electronic data,
   wherein the user interface information received by the third receiving unit is determined based on the designated type of the destination.

4. The scanning control apparatus according to claim 2, wherein the destination designated by the user is an e-mail address.

5. The scanning control apparatus according to claim 2, further comprising a second sending unit configured to send, to the server computer via the network, the generated electronic data,
   wherein the electronic data is further sent to the designated destination from the server computer.

6. The scanning control apparatus according to claim 1, wherein the first receiving unit is a Web browser, and the user interface information received by the first receiving unit is a Web page.

7. A server computer which is configured to communicate with a scanning control apparatus via a network, the scanning control apparatus being configured to cause a scanner to scan a paper document, the server computer comprising:
   a first sending unit configured to send, to the scanning control apparatus via the network, user interface information which provides a user interface for enabling a user to designate a scan parameter to be used for scanning of the paper document;
   a first receiving unit configured to receive, from the scanning control apparatus via the network, the scan parameter designated by the user via the user interface displayed at the scanning control apparatus; and
   a second sending unit configured to send, to the scanning control apparatus via the network, a scanning command to cause the scanner to scan the paper document, to generate electronic data, the sent scanning command being based on the scan parameter received by the first receiving unit.

8. The server computer according to claim 7, further comprising a third sending unit configured to send, to the scanning control apparatus via the network, user interface information which provides a user interface for enabling a user to designate a destination of the electronic data.

9. The server computer according to claim 8, further comprising a fourth sending unit configured to send, to the scanning control apparatus via the network, user interface information which provides a user interface for enabling a user to designate a type of the destination of the electronic data,
   wherein the user interface information sent by the third sending unit is determined based on the designated type of the destination.

10. The server computer according to claim 8, wherein the destination designated by the user is an e-mail address.

11. The server computer according to claim 8, further comprising:
   a second receiving unit configured to receive, from the scanning control apparatus via the network, the generated electronic data; and
   a fifth sending unit configured to send the electronic data to the designated destination from the server computer.

12. The server computer according to claim 7, wherein the user interface information sent by the first sending unit is a Web page.

13. A method used in a scanning control apparatus which is configured to communicate with a server computer via a network, and which is configured to cause a scanner to scan a paper document, the method comprising:

receiving, from the server computer via the network, user interface information which provides a user interface for enabling a user to designate a scan parameter to be used for scanning of the paper document;

displaying the user interface based on the user interface information received from the server computer via the network;

sending, to the server computer via the network, the scan parameter designated by the user via the displayed user interface;

receiving, from the server computer via the network, a scanning command to cause the scanner to scan the paper document, the received scanning command being based on the sent scan parameter;

causing the scanner to scan the paper document in accordance with the received scanning command, to generate electronic data.

14. A method used in a server computer which is configured to communicate with a scanning control apparatus via a network, the scanning control apparatus being configured to cause a scanner to scan a paper document, the method comprising:

sending, to the scanning control apparatus via the network, user interface information which provides a user interface for enabling a user to designate a scan parameter to be used for scanning of the paper document;

receiving, from the scanning control apparatus via the network, the scan parameter designated by the user via the user interface displayed at the scanning control apparatus; and sending, to the scanning control apparatus via the network, a scanning command to cause the scanner to scan the paper document, to generate the electronic data, the sent scanning command being based on the received scan parameter.

15. A computer-executable program retrievably stored on a non-transitory computer-readable storage medium for controlling a scanning control apparatus which is configured to communicate with a server computer via a network, and which is configured to cause a scanner to scan a paper document, the program comprising:

a program code for receiving, from a server computer via the network, user interface information which provides a user interface for enabling a user to designate a scan parameter to be used for scanning of the paper document;

a program code for displaying the user interface based on the user interface information received from the server computer via the network;

a program code for sending, to the server computer via the network, the scan parameter designated by the user via the displayed user interface;

a program code for receiving, from the server computer via the network, a scanning command to cause the scanner to scan the paper document, the received scanning command being based on the sent scan parameter; and a program code for causing the scanner to scan the paper document in accordance with the received scanning command, to generate electronic data.

16. A computer-executable program retrievably stored on a non-transitory computer-readable storage medium for controlling a server computer which is configured to communicate with a scanning control apparatus via a network, the scanning control apparatus being configured to cause a scanner to scan a paper document, the program comprising:

a program code for sending, to the scanning control apparatus via the network, user interface information which provides a user interface for enabling a user to designate a scan parameter to be used for scanning of the paper document;

a program code for receiving, from the scanning control apparatus via the network, the scan parameter designated by the user via the user interface displayed at the scanning control apparatus; and a program code for sending, to the scanning control apparatus via the network, a scanning command to cause the scanner to scan the paper document, to generate electronic data, the sent scanning command being based on the received scan parameter.

\* \* \* \* \*